United States Patent [19]

Takeuchi

[11] Patent Number: 5,783,138
[45] Date of Patent: Jul. 21, 1998

[54] METHOD FOR MOLDING AN EDGE PROVIDED BETWEEN A MOUTH PORTION AND A BODY PORTION OF A PLASTIC MOLDED HOLLOW ARTICLE

[75] Inventor: Setsuyuki Takeuchi, Nagano-ken, Japan

[73] Assignee: A.K Technical Laboratory Inc., Japan

[21] Appl. No.: 656,069

[22] Filed: May 31, 1996

Related U.S. Application Data

[60] Continuation of Ser. No. 209,773, Mar. 11, 1994, abandoned, which is a division of Ser. No. 25,823, Mar. 3, 1993, Pat. No. 5,297,686, which is a continuation of Ser. No. 814,112, Dec. 26, 1991, abandoned.

[30] Foreign Application Priority Data

Dec. 29, 1990 [JP] Japan ................... 2-406068
Dec. 29, 1990 [JP] Japan ................... 2-417079
Aug. 30, 1991 [JP] Japan ................... 3-077101

[51] Int. Cl.$^6$ ...................... B29C 49/06; B29C 49/20
[52] U.S. Cl. .................. 264/537; 264/230; 264/342 R
[58] Field of Search .................. 264/513, 523, 264/532, 537, 516, 230, 342 R; 425/525, 533, 503; 215/396, 398; 428/36.92, 542.8

[56] References Cited

U.S. PATENT DOCUMENTS

| 3,944,643 | 3/1976 | Sato et al. ................ 264/532 |
| 4,367,821 | 1/1983 | Holt ........................ 264/537 |
| 4,422,843 | 12/1983 | Aoki ...................... 264/532 |
| 5,038,454 | 8/1991 | Thornock et al. ......... 264/537 |

FOREIGN PATENT DOCUMENTS

| 136222 | 4/1985 | European Pat. Off. . |
| 480836 | 4/1992 | European Pat. Off. . |
| 2143262 | 3/1973 | Germany ................ 264/537 |
| 61-061823 | 3/1986 | Japan .................... 264/513 |
| 2131344 | 6/1984 | United Kingdom . |

*Primary Examiner*—Catherine Timm
*Attorney, Agent, or Firm*—Ostrolenk, Faber, Gerb & Soffen, LLP

[57] ABSTRACT

This invention relates to a bottle with an ear obtained by orientation blow molding, in which a mounting portion positioned at a predetermined height which has a large diameter and whose upper portion is composed of an outer wall in the form of an injection molded flange and an inner wall oriented internally thereof and placed in close contact therewith, said mounting portion having a predetermined width in an outer periphery thereof, is formed below a mouth portion of a bottle by injection orientation blow molding, an upper edge of said mounting groove is formed to have an edge having a plurality of notches at equal intervals, a mounting ring internally provided with a plurality of projecting surfaces positioned at the mounting groove through said notches is formed integral with a bended end of an ear, and the projecting surfaces of said mounting ring and the upper edge of said mounting groove are fitted with each other whereby the ear and the bottle are integrally connected.

5 Claims, 5 Drawing Sheets

METHOD FOR MOLDING AN EDGE PROVIDED BETWEEN A MOUTH PORTION AND A BODY PORTION OF A PLASTIC MOLDED HOLLOW ARTICLE

This is a continuation of application Ser. No. 08/209,773 filed on Mar. 11, 1994 now abandoned; which is a division of 08/025,823 filed on Mar. 3, 1993 now U.S. Pat. No. 5,297,686; which is a continuation of 07/814,112 filed on Dec. 26, 1991, now abandoned.

BACKGROUND OF THE INVENTION

(1) Field of the Invention

This invention relates to a bottle with a handle made of synthetic resin prepared by injection orientation blow molding.

(2) Description of the Related Art

A conventional method of manufacturing a bottle involves injection molding a preform and orientation blow molding portions other than a mouth portion of the preform into a thin wall-thickness configuration while holding the mouth portion. However, with this conventional method, it is technically difficult to mold a part of the preform into a handle during orientation blow molding, unlike normal blow molding. Therefore, the handle is molded below the mouth portion so as to be integral with the preform.

Molding of such a bottle can be achieved by a cold parison system which molds a preform using a normal injection mold to mold the preform into a bottle by an orientation blow molding machine. However, this has been difficult to use in the case of a hot parison system in which an entire process from an operation of injection molding of a preform up to orientation blow molding is carried out by a single apparatus.

In view of the foregoing problems, an attempt has been made to mount a handle after a bottle has been molded. In this case, however, the position at which a handle is mounted is limited to a location on the bottle above a support ring.

Therefore, the mouth portion of the bottle with a handle must be made longer than that of a normal bottle and a position at which the handle is mounted is relatively high on the body of the bottle. Therefore, particularly in a large bottle, it is difficult to tilt the bottle while holding the handle thereby preventing smooth pouring of the contents of the bottle.

The problems described above can be solved by an arrangement wherein a lower side of a bottle mouth is formed to have a large diameter portion, and threads are provided in the outer periphery of the large diameter portion, to which the handle is threadedly mounted, as disclosed in British Registered Design No. 1,039,436. However, with injection orientation blow molding, it is impossible to orient blow mold portions near the large diameter portion without impairing the dimension of the thread formed in the outer periphery of the large diameter portion.

In injection orientation blow molding, the thread of the mouth portion, the support ring and the like are injection molded to maintain molding accuracy. The portion of the bottle located under the support ring is made relatively thin by the orientation blow molding. For this reason, in the case where a large diameter portion having threads is formed below the support ring to threadedly mount a handle thereon, portions of the bottle near the large diameter portion remain thick-walled as a result of injection molding. As a result, the use of material per bottle increases, thus increasing cost.

Orientation blow molding has an advantage in that because portions other than the mouth portion can be molded to have a thin wall-thickness, a bottle which is lighter than that obtained by the normal blow molding and that has excellent impact resistance is obtained. As a result of the increase of non-oriented portions having a thin wall-thickness, a large diameter portion at which a handle is mounted is limited to being located near the mouth portion.

Moreover, mounting of a handle by means of a screw causes the handle to be easily loosened due to vibrations or the like, and a lower end of the handle is not connected to the body of a bottle resulting in the handle being easily removed from the bottle. When the bottle is inclined to pour the contents of the bottle, the load is concentrated on a bent portion at the upper portion of the handle to generate a flexure at the connection between the handle and the bottle. When such a handle is made of synthetic resin, a gripping portion of the handle is easily separated from the bottle.

SUMMARY OF THE INVENTION

According to the preferred embodiments of the present invention, a handle is mounted on a molded bottle after molding of the bottle. A handle mounting portion located on the bottle is preferably molded to have a thin wall-thickness and is located below a support ring so as to extend downwardly. The molded handle mounting portion and cooperating handle solve the problems described above with a conventional bottle having a handle with a mounting position located near the mouth of the bottle.

Furthermore, according to the preferred embodiments of the present invention, a handle mounting portion is located at a predetermined location on the bottle which has a larger diameter than a diameter of a mouth portion. An upper edge of the handle mounting portion is preferably subjected to orientation blow molding. The upper edge of the handle mounting portion maintains its injection molded state and the upper edge and a ring member integrally formed with a base end of the handle are fitted to each other whereby the handle is securely mounted and unable to be loosened, thus solving the problems with conventional bottles described above.

Moreover, according to the preferred embodiments of the present invention, a handle is mounted on a molded bottle after the bottle is molded, and a lower end of the handle can be securely fixed to the body of the bottle by extremely simple means, thereby solving the problems encountered in conventional bottles having handles in which a gripping portion thereof is separated from the bottle due to the load when the bottle is inclined.

According to a feature of the preferred embodiments of the present invention for achieving the aforesaid objects, there is provided an arrangement where a handle mounting portion is located at a desired position on the bottle which has a relatively large diameter and includes a mounting groove having a predetermined width in an outer periphery thereof formed below a mouth portion of the bottle by injection orientation blow molding. An upper edge of the mounting groove includes a plurality of notches formed at equal intervals. A mounting ring internally provided with a plurality of projecting surfaces is positioned on the mounting groove through the notches and is integral with a bent end of the handle. The projecting surfaces of the mounting ring and the upper edge of the mounting groove are fitted with each other to integrally connect the handle and the bottle.

According to a further feature of the preferred embodiments of the present invention, the upper portion of the handle mounting portion is composed of an outer wall of a flange which is injection molded below the mouth portion and an inner wall internally oriented and placed in close contact with the flange. The upper edge fitted into the mounting ring is formed so as to cooperate with an acute lower edge of the flange.

According to another feature of the present invention, the lower end of the handle mounted on the bottle is attached to the side of the body by means of a heat-shrinkable band fitted around the body of the bottle.

In the bottle with a handle as described above, since the handle mounting portion has a large diameter, the insertion of a mounting ring is not impaired by the threads in the outer periphery of the mouth portion and the support ring. When the handle is slightly turned, the upper edge of the mounting groove and the upper edge of the projecting surface located inside of the mounting ring are firmly engaged with each other. Therefore, mounting is simpler than in conventional devices which rely upon engagement between threads. In the preferred embodiments of the present invention, even if a load is imposed on the engaging portion, the handle is not disengaged unless the mounting ring is broken.

Moreover, only the upper portion of the handle mounting portion is composed of a flange which is injection molded below the mouth portion and a wall portion oriented internally thereof and placed in close contact with the flange. The other portions of the handle mounting portion are subjected to orientation blow molding. Therefore, the handle can be formed to have a thin wall-thickness configuration as compared with the case where the whole mounting portion is subjected to injection molding. The upper portion of the handle mounting portion has a strength due to the orientation of the inner wall portion, and a molding position thereof is not limited to a location on the bottle near the mouth portion.

Furthermore, since the lower end of the handle is attached to the side of the body by means of a heat-shrinkable band fitted around the body of the bottle, when the bottle is inclined, the load is not concentrated on only the upper portion of the handle because of the integration of the lower end of the handle and the body. In addition, the gripping portion is not damaged or separated from the bottle due to the load, and therefore, even a large bottle which is heavy because of the contents can be easily handled.

The present invention will be described in detail by way of preferred embodiments shown in the accompanying drawings.

BRIEF DESCRIPTION OF THE DRAWINGS

The drawings show preferred embodiments of a bottle with a handle according to the present invention.

DETAILED DESCRIPTION OF PREFERRED EMBODIMENTS

Figure 1:
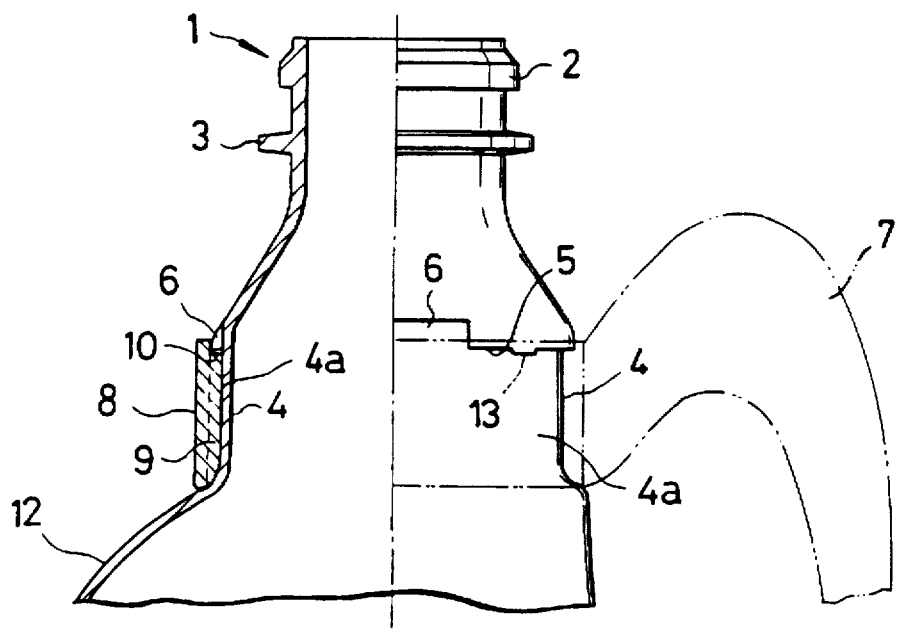
FIG. 1 is a longitudinal sectional side view of an upper half portion of a bottle according to a preferred embodiment of the present invention.
Figure 2:
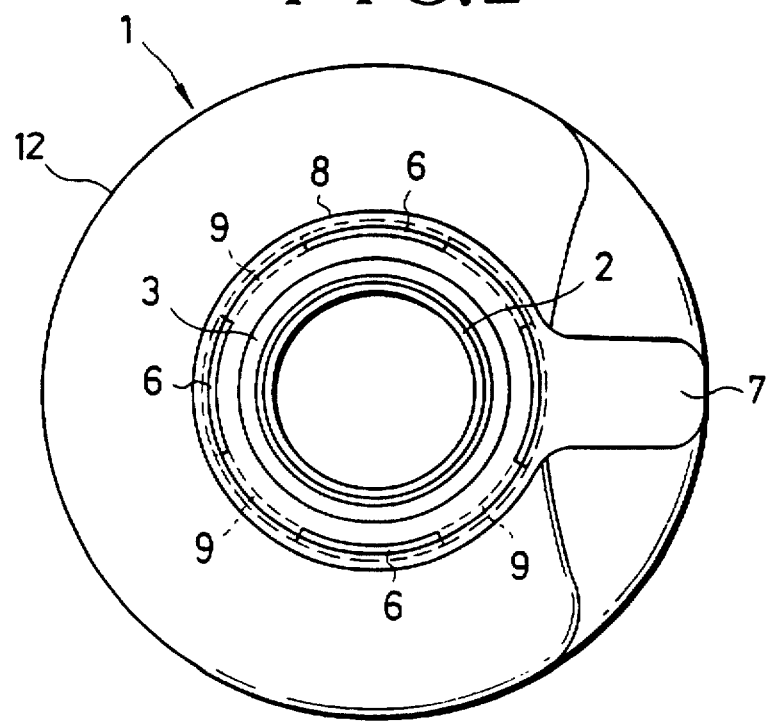
FIG. 2 is a plan view of the bottle shown in FIG. 1.

In the drawings, reference numeral 1 designates a bottle preferably formed of polyethyleneterephtalate (PETP) subjected to injection orientation blow molding. A support ring 3 is provided below a mouth portion 2.

Figure 3:
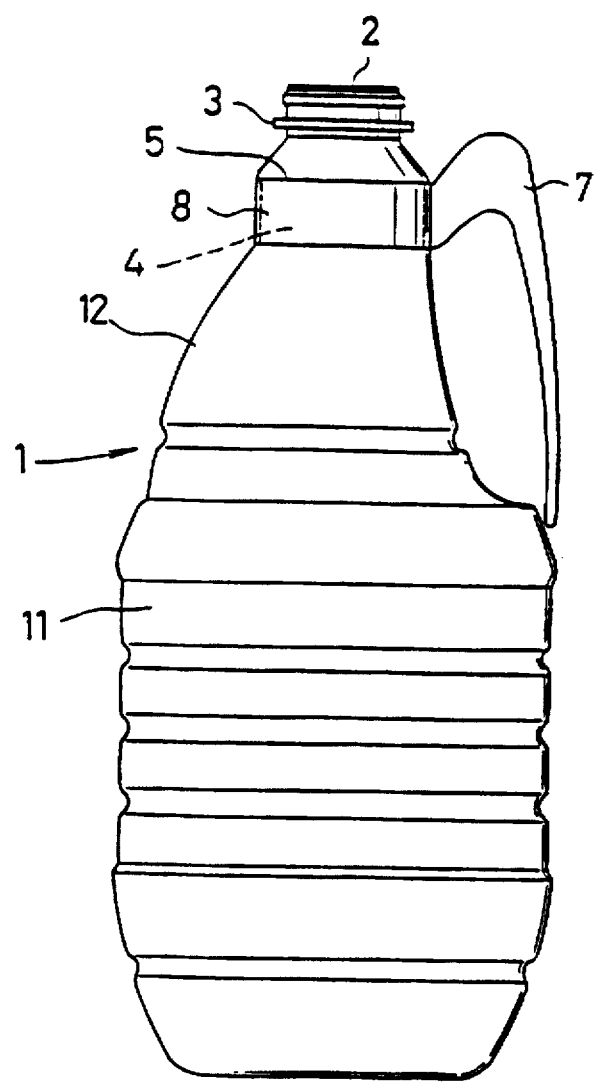
FIG. 3 is a side view of a bottle according to the preferred embodiment of the present invention shown in FIG. 1.

A continuous body portion 11 of the bottle 1 shown in FIG. 3 extending from below the support ring 3 includes a handle mounting portion 4 positioned at a desired location along the body portion 11. The portion of the bottle at the location of the mounting portion 4 has a larger diameter than the diameter of the support ring 3. A mounting groove 4a having a predetermined width is formed on the outer periphery of the body portion of the bottle at the location of the mounting portion 4.

The lower edge of the mounting groove 4a is connected to a curve portion of a shoulder 12 which forms an upper portion of the body 11. An upper portion of the mounting groove 4a is formed to be have an edge 5. Notches 6 are disposed at equal intervals at four locations of the upper edge 5.

Reference numeral 7 designates a handle preferably formed of PETP. The handle 7 has a mounting ring 8 integrally formed at an end thereof. Four projecting surfaces 9 are formed on an internal surface of the mounting ring 8 at locations corresponding to the notches 6 for mating with the notches 6 as described below. The upper edges of the projecting surfaces 9 form a shoulder 10 which is fitted into the upper edge 5 of the mounting groove 4a.

The upper edge of each of the projecting surfaces 9 is provided with a recess 13 which is fitted into an attachment mechanism 14 extending from the upper edge 5 of the mounting groove 4a to prevent a lateral deviation of the mounting ring 8.

Figure 7:
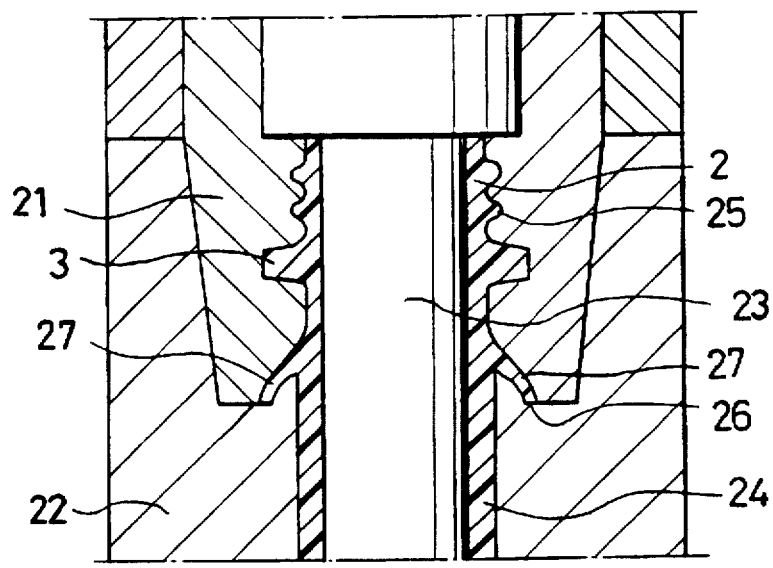
FIG. 7 is a sectional view of essential parts of an injection mold for explaining the injection molding step of an upper edge of a handle mounting portion of a preferred embodiment of the present invention.
Figure 8:
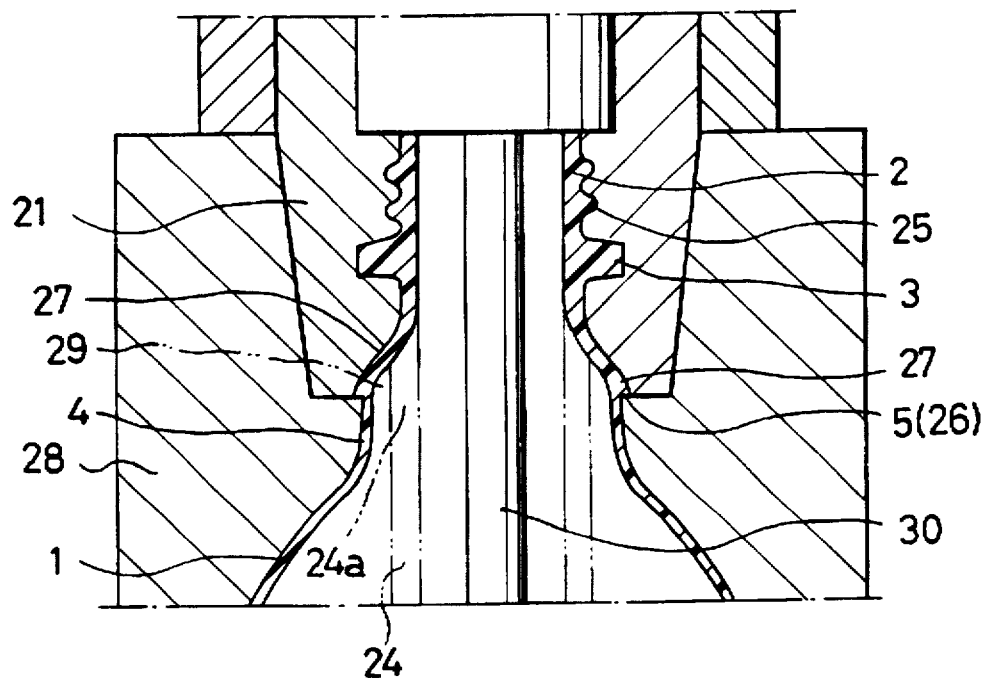
FIG. 8 is a sectional view of essential parts of a blow mold for explaining the blow molding step of a handle mounting portion and an upper edge of a preferred embodiment of the present invention.

The upper edge 5 of the mounting groove 4a is preferably formed from an injection molded member. FIGS. 7 and 8 explain the molding steps therefor. First, when a neck mold 21, a cavity mold 22 and a core mold 23 are closed to injection mold a preform 24, a flange 27 whose lower edge 26 is provided along with threads 25 on the outer periphery of the mouth portion 2 and the support ring 3 is inwardly integrally molded below the mouth portion 2 by making use of a dividing portion between the neck mold 21 and the cavity mold 22.

After the injection molding, the preform 24 is held by the neck mold 21 above the flange 27 and transported to the blow mold 28, where the molds are closed. Consequently, the preform body below the lower edge 26 of the flange 27 is positioned at the blow cavity. Within the blow cavity, a space 29 is formed between the inside of the flange 27 and the wall portion 24a of the preform indicated by the phantom line.

Next, air blowing is carried out while longitudinally orienting the preform 24 by means of an orientation rod 30. As a result, the preform body is longitudinally oriented from the end of the flange 27 and also laterally expanded to form a bottle 1 having a handle mounting portion 4 including a large diameter below the flange 27. In this bottle 1, the preform wall portion 24a located inside of the flange has a thin wall-thickness which is located close to the inside of the flange and is separated from the flange 27 by the space 29, and a recessed portion thereunder constitutes the mounting groove 4a.

Thereby, the flange 27 forms an upper outer wall of the handle mounting portion 4 of the bottle 1, and the lower edge portion 26 forms the upper edge 5 so that the handle mounting portion 4 has an upper portion composed of an outer wall subjected to injection molding and an oriented inner wall, with other portions being formed of thin walls by way of orientation blow molding.

While molding of notches 6 of the upper edge 5 is omitted in this step, it is to be noted that the notches 6 can be molded during molding of the flange.

In the above-described construction, the mounting ring 8 is placed over the mounting groove 4a from the mouth portion. Next, positioning between the notches 6 and the projecting surfaces 9 located inside of the mounting ring 8 is accomplished after which the mounting ring 8 is forcibly turned. Then the projecting surfaces 9 are positioned under the upper edges 5 and securely fitted to the mounting groove 4a.

As a result, the handle 7 is mounted on the side of the bottle. The handle is not disengaged from the bottle 1 unless the bottle 1 is held and the handle 7 is forcibly deviated laterally.

Figure 4:
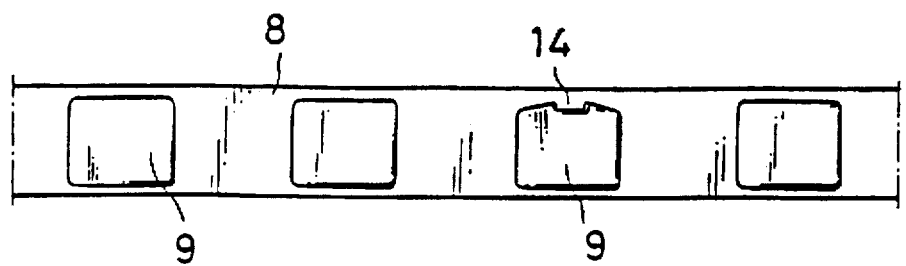
FIG. 4 is a detailed view of a mounting ring used in the preferred embodiments of the present invention.
Figure 5:
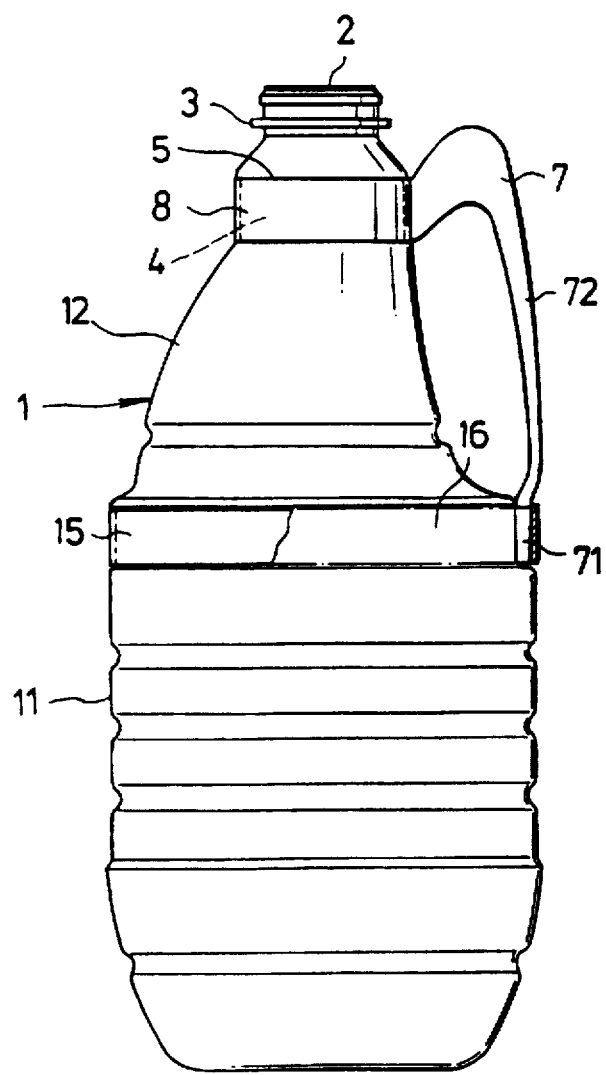
FIG. 5 is a side view of a bottle according to another preferred embodiment of the present invention including a handle having a lower end attached to a body of the bottle.
Figure 6:
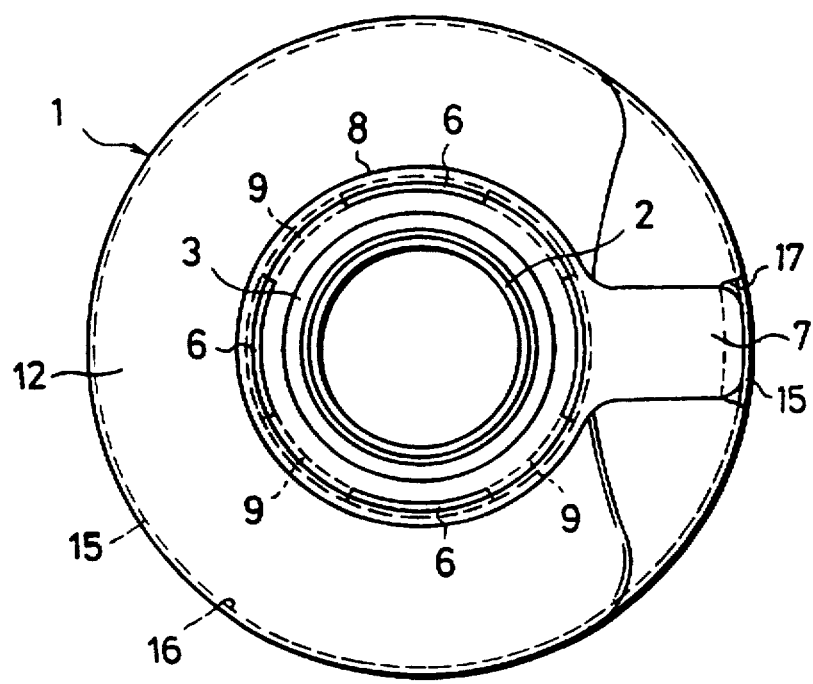
FIG. 6 is a plan view of the bottle shown in FIG. 5.

FIGS. 4 and 5 show a bottle in which a lower end 71 of the handle 7 is integrally attached to the body using a heat-shrinkable band 15.

The heat-shrinkable band 15 is preferably formed of PETP or the like. The band 15 before being shrunk is larger in diameter than the body. After the handle 7 has been mounted on the bottle 1, the band 5 is fitted from the top of the bottle into an annular groove 16 formed around the body.

A portion of the annular groove 16 at which a lower end 71 of the handle 7 is positioned is preferably formed with a recess 17. The heat-shrinkable band 15 is internally formed with a partial gap by the presence of the recess 17. The lower end 71 is positioned at the gap, and the lower end 71 is firmly attached to the body due to the reduction in diameter of the heat-shrinkable band 15 caused by heating.

In mounting the handle 7, the mounting ring 8 is placed over the mounting groove 4, and the notches 6 and the projecting surfaces 9 located inside of the mounting ring 8 are rotated into position and the handle 7 is inserted, after which the mounting ring 8 is forcibly turned, in a manner similar to the case shown in FIG. 1. Then, when the heat-shrinkable ring 15 is placed over the annular groove 16 and the ring 15 is heated by a conventional tunnel type heating device, the heat-shrinkable band 15 is reduced in diameter due to the shrinkage and placed in close contact with the body 11. Consequently, the lower end 71 of the handle 7 is pulled toward the body 11 due to the shrinking force and the lower end 71 of the handle 7 is firmly attached to the bottle.

In the bottle 1 as described above, because the lower end 71 of the handle 7 is attached to the body 11 by means of the heat-shrinkable band 15, the lifting load is not concentrated on the upper portion of the handle as experienced in conventional devices. Thus, when the bottle 1 is inclined, a gripping portion 72 is not separated from the bottle due to the lifting load. Therefore, the contents of the bottle are easily poured as compared with the case where a handle is merely mounted on the mouth portion. With the handle 7, even a large, heavy bottle is easily handled.

What is claimed is:

1. A method for molding a hollow plastic article having a mouth portion atop a body portion, the body portion having an upper end and a lower end, the method comprising the steps of:

bringing together a neck mold, a cavity mold and a core mold to form an annular mold cavity between the neck mold and the core mold and between the cavity mold and the core mold, the annular mold cavity being adapted to receive molten resin to form a preform, the neck mold for forming a neck portion of the preform, the cavity mold for forming a bottom portion of the preform located below the neck, and the core mold for extending into the cavity mold and the neck mold;

injecting molten resin into the annular mold cavity to form the preform, wherein the neck mold and the cavity mold are respectively shaped to form a flange on a continuous portion of the preform between the neck portion and the bottom portion, the flange including a substantially straight lower edge;

releasing the preform from the cavity mold and the core mold while retaining the preform with the neck mold;

transferring the preform with the neck mold into a blow mold including a cavity having:

(i) a first section for receiving the neck mold and the neck portion of the preform, (ii) a second section for receiving the bottom portion of the preform, the second section defining the shape of the body of the article, and (iii) a ledge for receiving at least a portion of the lower edge of the flange;

closing the blow mold over the neck mold and the preform such that neither the neck nor the lower edge of the flange is enlarged outward when blow molding.

blow molding the bottom portion of the preform outwardly against the second section of the blow mold cavity such that it is enlarged to merge with the flange and forms the body portion of the article, wherein the neck portion of the preform becomes the mouth portion of the article and the lower edge of the flange is positioned above the lower end of the body; and releasing and ejecting the blow molded article.

2. The method of claim 1, wherein the neck mold and the cavity mold are respectively shaped so as to define the annular mold cavity between the neck mold and the cavity mold and so as to form the flange such that the flange is inclined outwardly from the neck of the preform and inclined toward the bottom portion.

3. The method of claim 1, wherein the cavity of the blow mold at the lower edge of the flange is slightly smaller in cross section than the cavity of the neck mold at the flange so that when the preform is blow molded in the blow mold, the lower edge of the flange is formed at the plastic molded article.

4. The method of claim 1, further comprising molding a set of notches in the flange during the injection molding.

5. A method for molding a hollow plastic article having a mouth portion atop a body portion, the body portion having an upper end and a lower end, the method comprising the steps of:

bringing together a neck mold, a cavity mold and a core mold to form an annular mold cavity between the neck mold and the core mold and between the cavity mold and the core mold, the annular mold cavity being adapted to receive molten resin to form a preform, the neck mold for forming a neck portion of the preform, the cavity mold for forming a bottom portion of the preform located below the neck, and the core mold for extending into the cavity mold and the neck mold;

injecting molten resin into the annular mold cavity to form the preform, wherein the neck mold and the cavity mold are respectively shaped to form a flange on a continuous portion of the preform between the neck portion and the bottom portion, the flange including a substantially straight lower edge;

releasing the preform from the cavity mold and the core mold while retaining the preform with the neck mold;

transferring the preform with the neck mold into a blow mold including a cavity having:

(i) a first section for receiving the neck mold and the neck portion of the preform, (ii) a second section for receiving the bottom portion of the preform, the second section defining the shape of the body of the article, and (iii) a ledge for receiving at least a portion of the lower edge of the flange;

closing the blow mold over the neck mold and the preform such that neither the neck nor the lower edge of the flange is enlarged outward when blow molding, blow molding the bottom portion of the preform outwardly against the second section of the blow mold cavity such that it is enlarged to merge with the flange and forms the body portion of the article, wherein the neck portion of the preform becomes the mouth portion of the article and the lower edge of the flange is positioned above the lower end of the body;

releasing and ejecting the blow molded article; and attaching a handle or a seal onto the article by connecting the handle or the seal with the flange.

\* \* \* \* \*